Nov. 5, 1968  C. W. DE LISSE  3,409,622
BALL SCREW DRIVE FOR VARIABLE AREA JET NOZZLE
Filed May 26, 1967
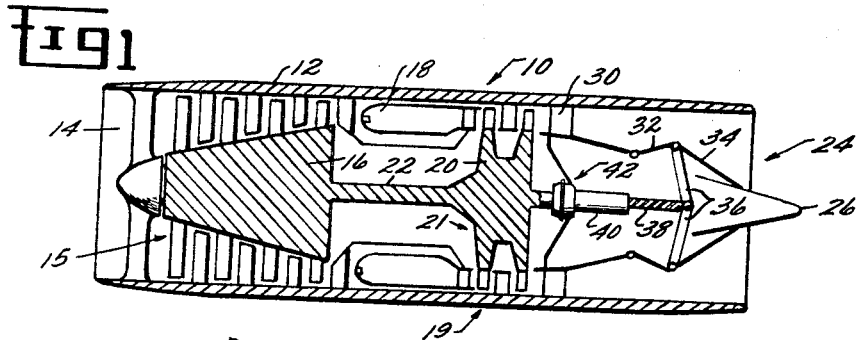
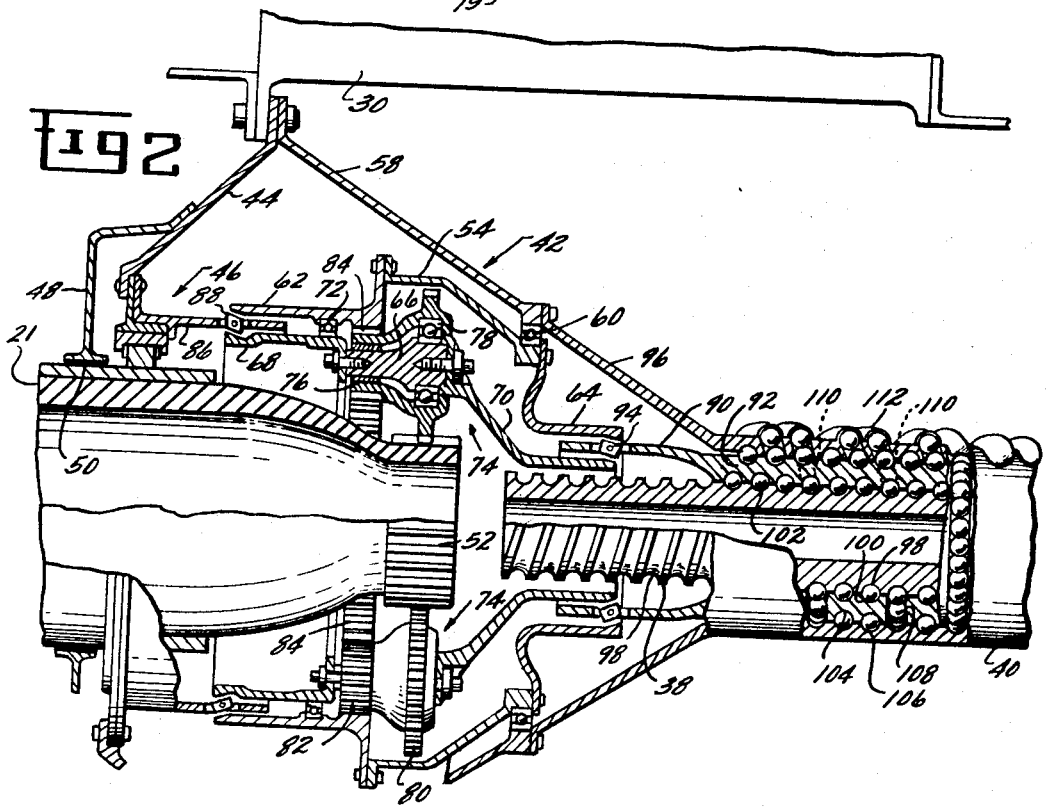
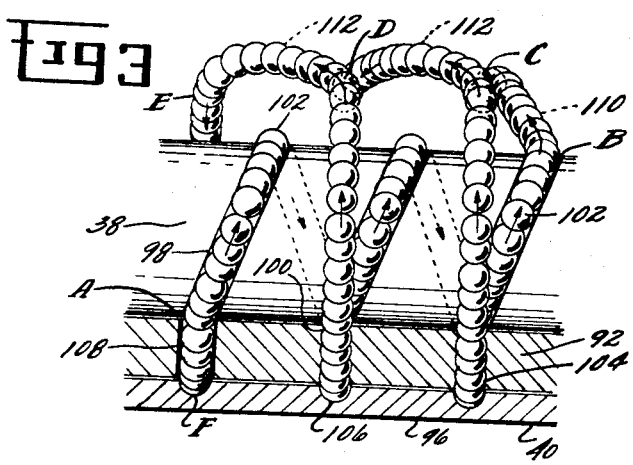
INVENTOR.
CARROLL W. DELISSE
BY
Gary M. Gron
ATTORNEY

United States Patent Office 3,409,622
Patented Nov. 5, 1968

3,409,622
BALL SCREW DRIVE FOR VARIABLE AREA JET NOZZLE
Carroll W. De Lisse, Cincinnati, Ohio, assignor to General Electric Company, a corporation of New York
Filed May 26, 1967, Ser. No. 641,573
6 Claims. (Cl. 60—271)

ABSTRACT OF THE DISCLOSURE

The disclosure illustrates a screw jack actuator 42 for use with a gas turbine engine 10 having a variable area exhaust nozzle 24. The actuator 42 has a sleeve 92 which is rotated by the rotor of the gas turbine engine 10 through a reversible gear system 42 to extend or retract a screw shaft 38. The screw shaft is connected by suitable mechanism 36 to the variable area nozzle. A recirculating path for ball bearings is provided between the screw shaft 38, the sleeve 92, and an outer journaling support 96 for the sleeve 92 so that the actuator size is minimized and axial loads from the variable area nozzle mechanism are uniformly transmitted to the support member for the nut.

---

The present invention relates to actuators and more specifically to actuators which provide a linear output in response to a rotary input from a power shaft.

There are many applications for the use of actuators in a gas turbine engine. A typical example of such a use is in a variable area exhaust nozzle commonly found in high performance gas turbine engines. In this use, the actuator positions a movable assembly which defines the exhaust nozzle area for the engine. It is common practice to position the variable area nozzle mechanism with a hydraulic actuator, which uses pressurized hydraulic fluid from a hydraulic pump. The hydraulic pump is driven through suitable gearing by a bladed drum which forms the engine rotor. Although this approach is effective in providing an accurate positioning of the nozzle, the power derived from the rotor of the engine to drive the pump reduces the amount of energy available to provide a primary propulsive force for the engine. Even when the nozzle position is fixed, thus requiring no substantial flow of hydraulic flow to the actuator, the pump still continues to pressurize the fluid and extract power from the rotor. This constant extraction of power reduces the overall efficiency of the engine.

In addition to this problem of efficiency, the constant pressurization of the hydraulic fluid generates a substantial amount of heat therein which must be dissipated. Normally, this is done with the use of a fuel or outside air heat exchanger. However, modern high performance aircraft burn so little fuel and fly at such high speeds that the availability of these fluids as heat exchange mediums rapidly diminishes thereby making it more difficult to effectively cool the hydraulic fluid.

It has been proposed, in an effort to alleviate these problems, to mechanically position the nozzle of such a gas turbine engine by using the power of the engine rotors through a mechanical gearing system which can be declutched from the rotor when the nozzle position is fixed. However, the types that have been proposed are extremely complicated and bulky structures which contribute appreciably to the overall weight of the engine. In addition, such systems, through their complex gearing arrangements, generate appreciable amounts of heat through friction. The increased weight and heat generation detracts from the overall efficiency of the engine.

Accordingly, it is an object of the present invention to provide simplified compact, highly efficient mechanical actuator mechanism which provides a linear output in response to a rotatable input.

It is a further object to provide an actuator of the above type in a gas turbine engine to position a moveable element such as a variable area exhaust nozzle, thereby minimizing the efficiency loss of the engine.

In one aspect of the invention, the above ends are achieved by providing an actuation system for use with a rotating power shaft. The actuation system comprises gear means connected to and driven by the power shaft. The gear means is adapted to selectively provide a stationary output and a bi-directional rotatable output. The output of the gear means drives an actuator which comprises a screw shaft having a helix groove thereon and being linearly displaceable and restrained from rotation. A rotatable sleeve surrounding the screw shaft is connected to the output of the gear means. A helix groove on the interior of the sleeve forms a helix path with the groove on the screw shaft. The sleeve has a plurality of circumferential axially spaced grooves on the exterior thereof. The grooves are normal to the axis of the sleeve. A fixed support element has an opening in which the sleeve is disposed. The support element has a plurality of circumferential axially spaced grooves on the interior of the opening to form a plurality of circumferential paths with the exterior grooves on the sleeve. Passageway means extend between adacent circumferential grooves on the interior of the support element to form a continuous path through each circumferential path and to the adacent circumferential grooves. Passageway means extend between the ends of the helix groove on the interior of the sleeve and the circumferential grooves radially outward therefrom to form a continuous path between the helix groove and the circumferential grooves. A plurality of anti-friction elements are disposed in the grooves for rolling recirculating movement through the path so that the screw shaft is linearly displaced in response to rotation of the sleeve by the gear means. Therefore, the friction generated by the actuator is minimized and reaction loads on the screw shaft are transferred to the support member through the anti-friction elements in the plurality of circumferential grooves to minimize the stress concentration in the sleeve.

In yet another aspect of the invention, the above actuation system is used in combination with a gas turbine engine having a moveable assembly such as a variable area exhaust nozzle. The gas turibne engine has a rotor which forms the power shaft for the actuation system and the screw shaft is connected to the assembly. As a result, the power extracted from the engine to move the assembly is minimized.

The above, and other related objects and features of the present invention, will be apparent from a reading of the description of the disclosure found in the accompanying drawing and the novelty thereof pointed out in the appended claims.

In the drawing:

FIGURE 1 is a highly simplified diagrammatic illustration of a gas turbine engine incorporating a mechanical actuator which embodies the present invention.

FIGURE 2 is an enlarged longitudinal section view of the mechanical actuator diagrammatically illustrated in FIGURE 1.

FIGURE 3 is an enlarged fragmentary view of the mechanical actuator shown in FIGURE 2.

Reference is had to FIGURE 1 which illustrates a gas turbine engine 10 in which the present invention may be utilized. The engine 10 comprises an annular outer casing 12, the front end of which forms an inlet 14 for air. The air passes through a compressor 15 where it is pressurized by a rotatable bladed drum 16 and discharged to a combustor 18. Fuel is injected into the combustor 18 by suitable means (not shown) and the resultant fuel-air mixture is ignited to generate a hot gas stream. The hot gas stream then passes through a turbine 19 and drives a second bladed drum 20 which is connected to the drum 16 by an interconnecting shaft 22 to form an engine rotor 21. The hot gas stream is discharged from the turbine 19 through a variable area exhaust nozzle, generally indicated by reference numeral 24, to produce a forward propulsive thrust.

The variable area exhaust nozzle 24 is formed by a fixed plug assembly 26 disposed in the aft portion of the annular engine casing 12 and secured thereto by radial struts 30. A first series of flaps 32 are pivotally mounted around the forward portion of the plug support member 26. A second series of flaps 34 are hinged to the flaps 32 and slide along the surface of the plug 26. The flaps 32 and 34 interfit to form an expansible annular throat portion of the nozzle 24. A series of links 36 extend from the hinge between flaps 32, 34 to a screw shaft 38 of a screw jack actuator 40, which is linearly displaced, to vary the throat area of the exhaust nozzle 24. The actuator 40 is rotatably driven to radially displace the screw shaft 38 by the engine rotor 21 as transmitted through a gear assembly 42. As will be later discussed, in detail, the gear assembly 42 is adapted to selectively provide an output which causes the screw shaft 38 to extend, retract, or remain fixed. The output of the gear assembly 42, and hence the exhaust nozzle area, may be controlled by well known control devices to select an exhaust nozzle throat area that gives the most efficient engine operation under diverse conditions.

Reference is now had to FIGURE 2 which shows in detail the actuator 40 and the gear mechanism 42. The aft end of the engine rotor 21 is journaled in a generally conical support element 44 by means of a bearing assembly 46. The annular support element 44 is bolted to the base of the series of radial struts 30. An annular wall element 48 extends from the conical support element 44 and engages the rotor 21 at a suitable seal 50 to form the forward portion of a sump chamber for the bearing 46. The end of the rotor 21 has integral therewith gear teeth which provide an input sun gear 52 for the gear assembly 42. A first annular output element 54 is journaled in a conical support element 58, bolted to the struts 30, by a bearing 60.

A first pair of annular friction clutch elements 62, 64 are respectively bolted to the forward and aft end of the output element 54. A second output element comprises a plurality of pins 66 secured between a second pair of friction clutch elements 68, 70. A bearing assembly 72, mounted between friction clutch elements 68, 62 journals the second output element relative to the first. A planetary gear assembly 74 is journaled over each of the pins 66 by bearings 76, 78. The gear assembly 74 has gears 80 which engage the sun gear 52 of the engine rotor and gears 82 which engage a ring gear 84 on the first annular output member.

A first annular clutch support element 86 is bolted to the support member 44 and extends between the rotatable clutch elements 62, 68. A suitable clutch elment, herein shown as a plurality of diamond-shaped friction elements 88, is mounted on support member 86 and displaceable to engage clutch element 62 and 68. A second annular clutch support element 90 extends between clutch elements 64 and is integral with a sleeve nut 92 of the actuments 64 and is integral with a sleeve nut 92 of the actuator 40. A second series of diamond-shaped clutch elements 94 are mounted on the support element 90 and are displaceable to selectively engage clutch elements 64, 70. The friction clutch elements 88, 94 may be actuated by means well known to those skilled in the art to achieve the various gear assembly rotary outputs as will later be discussed.

The sleeve 92 is disposed in a generally conical support element 96 which is bolted as an extension of the annular support element 58. The screw shaft 38 is disposed in the interior of the sleeve 92 and is restrained from rotation by the links 36. A helix groove 98 is formed on the screw shaft 38 and cooperates with another helix groove 100 on the interior of the sleeve 92 to form a continuous helix path about the sleeve 92. A plurality of anti-friction elements such as balls 102, disposed in the helix path, enable the screw shaft to be linearly displaced in response to rotation of the sleeve 92. A plurality of axially spaced circumferential grooves 104, formed on the exterior of the sleeve 92, cooperate with corresponding grooves 106 on the interior of the support element 96 to form a plurality of circumferential paths normal to the axis of the sleeve 92. Balls 102 are also disposed in the circumferential paths to enable rotation of sleeve 92 in the support element 96. The balls 102 are guided to circulate between the helix grooves and the circumferential grooves by passageways 108, 110. The balls 102 are circulated between adjacent circumferential grooves by tubular passageways 112 which extend between adjacent circumferential grooves 106 on the support element 96. In this manner, the balls 102 circulate through the helix path and through the circumferential grooves in a continuous path as will later be described in detail.

In operation, the engine rotor 21 rotates continuously in one direction when the engine is operating. This rotation causes the gear teeth 52 to drive the gear assemblies 74. The friction clutch elements 88, 94, selectively displaced, provide a rotational output to the sleeve 92 which is stationary or bidirectional as described below. The sleeve 92 may be held in a stationary position by displacing friction clutch elements 88, 94 so that they engage clutch elements 62, 64. In this fashion, the sleeve 92 is coupled to the annular support 86 and restrained from rotation. At the same time, the clutch elements 68, 70 are free to rotate and the gear assemblies 74 rotate about the axis of the sun gear as they rotate about their own axis. The sleeve 92 may also be held in a stationary position by displacing the friction clutch elements 88, 94 to engage clutch elements 68, 70. In this position, the gear assemblies 74 rotate about their own fixed axis and cause the annular output element 54 to rotate.

If it is desired to rotate the sleeve 92 in the direction of rotation of the rotor 21, the friction clutch element 88 engages element 62 to restrain it from rotation while the friction clutch element 94 engages clutch element 70 to couple it to the sleeve 92. In this condition, sun gear 52 drives the planetary gear assemblies 74 around the fixed ring gear 84 which causes the axis of planetary gears 74 to rotate about the axis of the sun gear 52. This causes the clutch element 70 and the sleeve 92 to rotate in the direction of rotation of the rotor 21 which displaces screw shaft 38 in one direction.

To reverse the rotation of sleeve 92 and the displacement of screw shaft 38, the friction clutch element 88 engages element 68 and restrains it from rotation and the friction clutch element 94 is engaged to couple clutch element 64 to the sleeve 92. During this condition, the axis of the planetary gears 74 are fixed and the rotation of the sun gear 52 in engagement with the planetary gear teeth 80 cause the teeth 82 to drive the ring gear 84 in a direction opposite that of the ring gear 52. As a result, the clutch element 64 and the sleeve 92 rotate in a direction opposite that of the rotor 21 which reverses the direction of rotation of the screw shaft 38. As previously stated, it is apparent that manipulation of the friction clutch element 88, 94 may be achieved by suitable means to obtain a position control of the screw shaft 38 and hence the nozzle area of the engine 10.

As the sleeve 92 rotates and the screw shaft 38 translates, the balls 102 circulate through the circumferential and helical paths as follows. When the sleeve 92 is rotated in a clockwise direction, looking toward the gear assembly 42, the balls traverse the circumferential path formed by grooves 104, 106 and are diverted by suitable means well known in the art to the passageway 108 and enter the helical path at point A (as shown in FIGURE 3). From there, the balls traverse the helical path formed by the helical groove 100 and the corresponding groove 98. When the balls reach point B they are diverted through passageway 110 into the circumferential path formed by grooves 104, 106. In the circumferential path, the balls 102 travel clockwise to point C where they are diverted into and through tubular passageway 112 to the adjacent circumferential groove 106. Again, the balls circulate around the path to point D where they are diverted through another tubular passageway 112 to the adjacent groove 106 at point E. From there, the balls 102 travel half way around the circumference to point F where they are diverted through passageway 108 to point A to recirculate.

The provision of ball bearings 102 to circulate, not only through the helix path but through the circumferential paths to journal the sleeve 92, significantly reduces the friction generated by the actuator 40. As such, the heat generated by the actuator is relatively small and is easily dissipated by fluid which would normally be used to lubricate the balls. In addition, the provision of the plurality of balls to journal the sleeve 92 enables a great reduction in weight and radial size, thus enhancing its use for an aircraft engine.

Another advantage is found in the fact that the plurality of circumferential paths enables an even transfer of load from the screw shaft 38 to the support element 96. This minimizes the stress concentration in the sleeve 92 and enables even greater weight and size reduction.

In some applications where the axial loads on the screw shaft 38 are particularly high, as in the case of a nozzle actuator, it is necessary to have a large number of circumferential paths to minimize the balls recirculating through any one path and avoid crowding, a plurality of paths are provided. As illustrated, particularly in FIGURE 2, there are provided three separate circulation paths for the balls 102. Any number may be used depending upon the particular load requirements of the actuator 40.

While the present invention has been described in connection with a plug nozzle actuation system of a gas turbine engine, it is apparent that equal advantages will be obtained using the actuator described to provide a linear output in response to rotary input from any power source. Therefore, it is to be understood that modifications may be made by those skilled in the art without departing from the spirit of the invention. Accordingly, the scope of the invention is to be determined solely by the following claims.

Having thus described the invention what is claimed as novel and desired to be secured by Letters Patent of the United States is:

1. An actuation system for use with a rotating power shaft, said actuation system comprising:
    planetary gear means connected to and driven by said power shaft, said gear means being adapted to selectively provide a stationary output and a bi-directional rotatable output,
    an actuator powered by the output of said planetary gear means, said actuator comprising:
    a screw shaft having a helix groove thereon, said screw shaft being restrained from rotation and being linearly displaceable,
    a rotatable sleeve surrounding said screw shaft and being connected to the output of said gear means, said sleeve having a helix groove on the interior thereof to form a helix path with the groove on said screw shaft,
    said sleeve having a plurality of circumferential axially spaced grooves on the exterior thereof, said grooves being normal to the axis of said sleeve,
    a fixed support element having an opening in which said sleeve is disposed,
    said support element having a plurality of circumferential axially spaced grooves on the interior of said opening to form a plurality of circumferential paths with the exterior grooves on said sleeve,
    passageway means extending between adjacent circumferential grooves on the interior of said support element to form a continuous path through each circumferential groove and to the adjacent circumferential grooves,
    passageway means extending between the ends of said helix groove on the interior of said sleeve and the circumferential grooves radially outward therefrom to form a continuous path between the helix groove and the circumferential grooves,
    a plurality of anti-friction elements disposed in said grooves for rolling recirculating movement through said path, so that said screw shaft is linearly displaced in response to rotation of said sleeve by said gear means,
    whereby the friction generated by said actuator is minimized and reaction loads on said screw shaft are transferred to said support member through the anti-friction elements in the plurality of circumferential grooves to minimize the stress concentration in said sleeve.

2. An actuation system as in claim 1 in combination with a gas turbine engine having a rotor and a movable assembly wherein,
    the engine rotor forms said power shaft, and
    said screw shaft is connected to said movable assembly,
    whereby the power extracted from said engine to move said assembly is minimized.

3. Apparatus as in claim 2 wherein,
    said movable assembly is an exhaust nozzle comprising:
    an annular outer duct through which the exhaust of said gas turbine engine passes,
    an inner annular assembly movable in relation to the outer duct to vary the area of said exhaust nozzle, said annular assembly being subjected to substantial aerodynamic loads,
    said shaft being connected to said movable annular assembly,
    said support member comprises an annular support element in which the end of said rotor is journaled,
    whereby the loads on said plug are transmitted to said support member.

4. Apparatus as in claim 3 wherein,
    said passageway means form with said helix and said circumferential grooves a plurality of continuous paths.

5. Apparatus as in claim 3 wherein said gear means comprises:
    input sun gear means formed on the end of said rotor,
    a first annular output element rotatable about the exterior of said sun gear means,
    ring gear means formed on the interior of said first annular output element,
    a second annular output element rotatable between said sun gear means and said first annular output element,
    planetary gear means rotatably mounted on said second annular output element for engaging said input sun gear means and said output ring gear means,
    means for selectively coupling said first and second annular output elements to the sleeve of said actuator,
    means for selectively restraining said first and second output elements from rotation,
    whereby the sleeve on said actuator may be selectively fixed and rotated to extend and retract said screw shaft.

6. Apparatus as in claim 5 wherein, said actuator sleeve has an annular portion extending therefrom to between said first and second annular output elements at one end thereof, said selective coupling means comprises clutch means for selectively engaging said first and second annular output elements with the annular portion of said sleeve, said fixed support element has an annular portion extending therefrom to between the first and second annular output elements at the opposite end thereof, said selective restraining means comprises clutch means for selectively engaging said first and second output elements with the annular portion of said support element.

References Cited

UNITED STATES PATENTS

| | | | |
|---|---|---|---|
| 2,483,401 | 10/1949 | Cole | 60—242 XR |
| 2,946,235 | 7/1960 | Musser | 74—424.8 |
| 3,178,958 | 4/1965 | Beck | 74—424.8 |
| 3,213,702 | 10/1965 | Deehan et al. | 74—424.8 |
| 3,371,551 | 3/1968 | Profet | 74—424.8 |
| 2,760,336 | 8/1956 | Reniger | 60—242 XR |

CARLTON R. CROYLE, *Primary Examiner.*